United States Patent Office 2,910,506
Patented Oct. 27, 1959

2,910,506

PROCESS OF PREPARING LOW MOLECULAR WEIGHT ALKYL MONOSULFIDES

Hillis O. Folkins, Crystal Lake, and Elmer L. Miller, Cary, Ill., assignors to The Pure Oil Company, Chicago, Ill., a corporation of Ohio No Drawing. Application November 28, 1956
Serial No. 624,738

6 Claims. (Cl. 260—609)

This invention relates to the synthesis of thioethers. It is more directly concerned with catalyst compositions employed in promoting the efficiency of the reaction between low molecular weight alcohols and hydrogen sulfide to produce low molecular weight aliphatic monosulfides.

Because alkyl monosulfides show a marked tendency to form addition products with a wide variety of chemicals, e.g., mercuric salts, halogens, alkyl halides and others, they are important as chemical intermediates. For example, dimethyl sulfide is used in the production of dimethyl sulfoxide, an important chemical for use as a solvent, anti-freeze, etc. In addition, the lower molecular weight thioethers exhibit solvency action for a variety of organic substances alone or in combination with other organic materials, such as low molecular weight aliphatic monohydric alcohols.

It is known that thioethers can be prepared by means of a plurality of syntheses. Perhaps the best known from a commercial standpoint involves the formation of monosulfides from organic halides and sodium mercaptides in a reaction related to the Williamson synthesis. In carrying out this type of reaction it has also been found possible to employ sodium ethoxide with the marcaptan and halogen derivative. Other reactions which are disclosed in the literature involve the reacting of sulfur and a normally gaseous monoolefin under suitable reaction conditions. Also, sulfides may be formed by the action of some mercaptans with an alcohol. However, this reaction is not flexible because in certain instances the reactants involved react to form the oxyether. For example, benzyl mercaptan and ethyl alcohol react to form an oxyether. While excellent yields may be obtained from the reaction between an alkyl halide and a sodium mercaptide, the reactants involved in this type of reaction are not always readily available under favorable economic conditions to permit large scale production. While the latter two reactions employ substances which can be economically and conveniently obtained or produced from various by-products from industries such as the petroleum industry, the low yields or unpredictability of these reactions make them unsatisfactory from an economical and commercial standpoint. However, it has been found, according to this invention, that excellent yields of low molecular weight thioethers may be produced by reacting a low molecular weight aliphatic monohydric alcohol and hydrogen sulfide, both of which are low-priced products which may be conveniently obtained in commercial quantities.

It is, therefore, an object of this invention to provide an economical and practical process for the preparation of alkyl monosulfides from aliphatic, monohydric alcohols and hydrogen sulfide. It is a further object of this invention to provide a catalyst composition which may be employed effectively in increasing the production of alkyl monosulfides from an aliphatic, monohydric alcohol and hydrogen sulfide. These and other objects will become more apparent from the following detailed description of the instant invention.

One of the classic methods for the production of thiols involves the reaction:

(1) $$ROH + H_2S = RSH + H_2O$$

In carrying out this reaction, an alkyl monosulfide is produced as a by-product by the competing reaction:

(2) $$2ROH + H_2S = R_2S + 2H_2O$$

or by the condensation of at least part of the thiols produced in the first reaction:

(3) $$2RSH = R_2S + H_2S$$

The subject invention is primarily concerned with the production of alkyl monosulfides which presumably occurs principally by reaction 2, accompanied by reaction 3 in varying degree. However, the selection of a catalyst for effecting this objective cannot be made on the basis of experience with catalyst compositions developed for the production of thiols in accordance with the foregoing reaction. For example, some catalyst compositions which have been employed in promoting this reaction to produce substantial amounts of thiols do not exhibit a sensitivity to mole ratio of reactants. Regardless of whether a low or high ratio of hydrogen sulfide to alcohol is employed, the selectivity of these catalysts toward the production of alkyl monosulfides remains low and substantially unvarying.

According to this invention, it has been found that in reacting a low molecular weight aliphatic alcohol with hydrogen sulfide, almost quantitative selectivity for monosulfide formation can be obtained by carrying out the reaction under suitable reaction conditions in the presence of an alumina-silica catalyst prepared by calcining the alumina support prior to incorporating the silica component of the catalyst composite. By carrying out the invention under controlled operating conditions, alkyl monosulfides can be produced as the principal products from the reaction between a low molecular weight, saturated aliphatic monohydric alcohol and hydrogen sulfide.

In carrying out the reaction, temperatures in the range of 600–950° F. may be employed. In the event that higher molecular weight alcohols are employed, the operating temperatures are lowered. Preferred temperatures for reacting methanol and hydrogen sulfide are in the range of 700–850° F. Pressures may vary widely, but are in the range of atmospheric to 200 p.s.i.g. Since increase in pressure tends to favor sulfide formation over that of thiols, it is generally preferable to operate at pressures greater than atmospheric. Preferred ranges are from about 50–200 p.s.i.g. Mole ratios of hydrogen sulfide/alcohol are in the range of 0.2–0.7. Ratios of reactants in excess of the preferred range have a deleterious effect on the selectivity of the catalyst for producing the alkyl sulfide. However, even at these higher ratios the advantages of precalcining the alumina support prior to incorporating the silica component are apparent.

In order to illustrate the advantages of the process of this invention, comparative data are shown in Table I in which the process of this invention, employing a precalcined alumina-silica composite catalyst, is compared with similar processes carried out in the presence of an alumina catalyst and a co-precipitated alumina-silica catalyst in which the combination of components was calcined after being prepared according to conventional co-precipitation techniques. (Vide Catalysis; Emmett, Reinhold (1954) page 341.)

The illustrative alumina-silica catalyst, containing precalcined alumina, employed in the process of this invention was prepared as follows: 400 grams of granular (Alcoa F-10) activated alumina, which is prepared by the controlled calcination of alpha-alumina trihydrate, was heated to around 1050° F. for four hours. The thus-calcined alumina was impregnated with a solution of 31 gms. of ethyl ortho-silicate in 160 cc. of 200-proof ethanol. The resulting mass was evaporated to dryness and further dried at 230° F. The catalyst was then calcined at 1050° F. for six hours.

Similarly, the precalcined alumina in the alumina-silica catalyst may be prepared by other methods and the silica subsequently added by appropriate means. An example of such a preparation follows: 1,000 grams of $AlCl_3 6H_2O$ is dissolved in 10 liters of distilled water. An aqueous solution of ammonia consisting of 840 cc. of concentrated ammonium hydroxide (around 28.5 percent $NH_3$) in 2300 cc. of solution is added slowly with stirring to the aluminum chloride solution. The resulting precipitate is filtered and the filter cake washed with very slightly ammoniacal water to rid the cake of undesirable salts. The washed precipitate is then dried at around 230° F. for several hours and calcined for about 16 hours at 1000–1050° F. The calcined alumina is then impregnated with ethyl ortho-silicate followed by drying and calcination to produce the desired catalyst composition.

Table I

| Catalyst composition: | | | |
|---|---|---|---|
| Weight, percent $Al_2O_3$. | 97.8 | 100 (F-10) [1] | 95.0. |
| Weight, percent $SiO_2$. | 2.2 | | 5.0. |
| Silica added | After calcination. | | Before calcination of $Al_2O_3$. |
| Reaction conditions: | | | |
| Temp., °F | 752 | 753 | 752. |
| Press., p.s.i.g | 0 | 0 | 0. |
| $CH_3OH$—LVHSV. | 0.38 | 0.38 | 0.38. |
| $H_2S/CH_3OH$ (mol. ratio). | 2.0 | 2.0 | 2.0. |
| Dimethyl sulfide yield (mol. percent). | 36.9 | 21.6 | 19.7. |
| Selectivity (percent). | 43.2 | 31.0 | 37.3. |
| Conversion, percent. | 85.4 | 68.7 | 53.1. |

[1] A proprietary activated alumina obtained from the Aluminum Co. of America.

Similar results were also obtained when an alkali metal silicate was employed to incorporate the same amount of silica component in precalcined alumina prepared as in the foregoing catalyst preparation.

In this preparation, a solution consisting of 10 cc. of sodium silicate ($SiO_2/Na_2O=3.26$, and containing 30.5 percent $SiO_2$) in 100 cc. of distilled water was used to impregnate 150 gms. of pre-calcined (Alcoa F-10) activated alumina. To the wet mixture was added, with stirring, 50 cc. of an aqueous solution containing 3 cc. of concentrated hydrochloric acid. The catalyst mass was digested and dried on a steam bath followed by further drying in an oven at 230° F. for 16 hours. The catalyst was washed free of salts and calcined at 1000° F. for 8 hours.

A highly active and selective catalyst was prepared which, when employed using the above reaction conditions, gave a conversion of 90.9%. At a selectivity of 47.3%, the dimethyl sulfide yield was 43 mol percent.

From the data in Table I, it is seen that the alumina-silica catalysts prepared by calcining the alumina prior to incorporating the silica component show increased conversions over the other catalyst compositions tested, even at the relatively high mole ratios of reactants, e.g., 2.0. It has been found that the reactant ratio has a distinct effect upon selectivity for sulfide formation. Accordingly, when carrying out the process of this invention at a reactant ratio of about 0.2–0.7 at properly selected operating conditions and pressure, increased conversion and almost quantitative selectivity for sulfide formation are obtained.

At operating conditions chosen to be favorable for the selective production of dimethyl sulfide, viz, 750° F.; atmospheric pressure; a liquid volume hourly space velocity, based on methanol, of 0.7; and at a hydrogen sulfide to methanol mol ratio of 0.5 in employing the preferred catalyst (prepared by the deposition of 2 wt. percent silica on a pre-calcined support in the manner hereinbefore disclosed), a conversion of 94 percent, and a molal yield of around 86 percent of dimethyl sulfide, giving a selectivity of around 92 percent, is obtained. Using a similar catalyst of the same chemical composition in which the silica is incorporated before the thermal conditioning of the alumina, the following results are obtained: conversion of 78 percent, and a molal yield of dimethyl sulfide of 68 percent, giving a selectivity of around 87 percent.

As it has been pointed out above, the catalysts of this invention are specific in that they are receptive to changes in reactant ratio, whereas many other catalysts of this nature are not. Reference to Table II shows results obtained over a potassium carbonate-alumina catalyst where substantially no change in selectivity of reaction occurred regardless of the mole ratio of reactants employed.

A potassium-carbonate-alumina catalyst employed in a process for the preparation of low-molecular-weight alkyl mercaptans is disclosed and claimed in copending application, Serial No. 446,398 filed July 28, 1954.

Table II

[Conditions: Atmospheric pressure; 752° F.; total gaseous space velocity STP)=200.]

| Catalyst | Mol Ratio, $H_2S/CH_3OH$ | Methyl Sulfide | |
|---|---|---|---|
| | | Yield (Mol percent) | Selectivity, percent |
| $Al_2O_3$—$K_2CO_3$(5.3 weight percent) | 2.00 | 3.3 | 3.9 |
| | 1.54 | 4.3 | 5.4 |
| | 1.19 | 3.5 | 4.8 |
| | 0.89 | 3.3 | 5.0 |

Similar results are obtained over a catalyst composed of 10% magnesium oxide deposited on pumice. At a $H_2S/CH_3OH$ ratio of 2.0, a sulfide yield of 15 mole percent is obtained at a selectivity for sulfide formation of 30%. At a $H_2S/CH_3OH$ ratio of around 0.6, a slightly lower yield (12 mole percent) is obtained but selectivity remains constant at about 30%.

The catalysts which are combined in carrying out the process of this invention can be prepared according to the following general procedure:

(1) The preparation of a precipitated or gelled alumina may be carried out by any of the well-known procedures. Generally this is done by precipitation from an aqueous solution of an aluminum salt, such as the chloride, sulfate, nitrate, etc. by the addition of a base, such as ammonia, sodium carbonate, sodium hydroxide, etc. Other known methods such as precipitation from sodium aluminate solutions also may be employed.

(2) Wash the alumina gel free of foreign ions.

(3) Dry the wet mass at a temperature of about 200°–250° F.

(4) Calcine the alumina gel at 800–1300° F., but preferably at 1000–1200° F. for a time sufficient to convert the hydrate to activated alumina.

(5) Incorporate silica by any of several known methods as for example:

(a) Impregnate the calcined alumina with water glass to form a silica gel by treatment with acid and dehydrate the silica gel by calcination.

(b) Impregnate the calcined alumina with alkyl silicates or the like and calcine at 800–1100° F.

(6) If foreign cations are introduced during the silica addition, they must be removed before final calcining, by washing or ion exchange.

The concentration of silica required to produce an effective catalyst will vary, with as little as 0.5 wt. percent often being effective. In general, the preparation technique may be used to prepare catalysts containing 0.5–25 wt. percent silica, but it is preferred that a final silica content of about 2–10 wt. percent be obtained. The alumina support which is precalcined prior to incorporating the silica component can be prepared from aluminum trihydrate as outlined above, or may be in the form of so-called "activated alumina" of commerce (cf. U.S. Patents 1,868,869 and 2,015,593) provided the calcination step in the activated alumina preparation is carried out at a temperature in excess of 800° F. In addition, other natural or synthetic aluminas having large surface areas in excess of about 10 sq. meters/gram can be used if properly precalcined.

To incorporate the silica any conventional impregnation technique can be employed using the pre-calcined alumina as the adsorbent. Preferred impregnating solutions include water glass which can be employed to incorporate the silica by general procedures similar to those described in "Catalysis" by Emmett, Reinhold (1954), page 247. Usually, it is preferred to impregnate the activated alumina with aqueous solutions of water glass, containing enough sodium silicate to give the desired amount of silica, and to subsequently form the silica gel within the pores of the support by adding acid in a manner analogous to that employed in making silica gel (U.S. Patent No. 2,499,680).

Organic silicon-containing compounds such as alkyl silicates which decompose to form silica in accordance with the method described in U.S. Patent 2,493,896 may be used to incorporate the silica. Similarly, the silica may be added to the precalcined alumina by impregnation with dilute sols such as silica organosols (colloidal silica in such compounds as ethyl Cellosolve organic esters and alcohols, etc.) Preparation of these sols are described in "Soluble Silicates II," by Vail, Reinhold (1952), page 515. The thus impregnated catalyst is then calcined to remove the organic component.

In the practice of this invention, there can be used any low-molecular-weight, aliphatic, monohydric alcohol having 1 to 8 carbon atoms per molecule, e.g. methyl, ethyl, octyl, and others. Although reactant alcohols usually will be charged separately, mixtures of alcohols may be employed. In such cases, a mixture of sulfides will be produced, their respective amounts corresponding in general to the relative reactivities of the alcohols. In general, symmetrical sulfides corresponding to the respective alcohols will be formed along with varying amounts of unsymmetrical sulfides, providing the reactivities of the charged alcohols are not greatly different. Thus, a mixture of methyl and ethyl alcohol will yield principally methyl and ethyl sulfides with varying amounts of methyl ethyl sulfide. Although excellent feed conversions and selectivities can be obtained by controlling the reactant ratios in employing the catalysts of this invention, increased efficiency may be obtained by recycle operations wherein unreacted products contained in the reaction effluent are returned to the reaction zone for further processing. Accordingly, by employing a proper recycle system alkyl monosulfide yields approaching 100% may be obtained.

The purification process employed in recovery of the thioethers prepared according to this invention will depend upon the volatility characteristics of the end-product. Generally, however, conventional fractional condensation and distillation processes may be employed, as well as suitably designed absorption processes. For an example see U.S. Patent application Serial No. 431,230, filed May 20, 1954.

It is apparent from the specific embodiment illustrating this invention that various modifications can be made without departing from the scope of this invention. Accordingly, the subject invention is limited only in the manner defined by the appended claims.

Accordingly, we claim as our invention:

1. A process for the preparation of low-molecular-weight alkyl monosulfides which comprises reacting a $C_1$–$C_8$ monohydric alkanol with hydrogen sulfide in the presence of an alumina-silica catalyst consisting essentially of activated alumina precalcined at a temperature of about 800°–1300° F. and having incorporated therein subsequent to being precalcined from 0.5 to 25% of silica.

2. A process for the preparation of low-molecular weight alkyl monosulfides which comprises reacting a $C_1$–$C_8$ monohydric alkanol with hydrogen sulfide, in a mole ratio of $H_2S$/alcohol of about 0.2–0.7, under suitable conditions of temperature and pressure in the presence of an alumina-silica catalyst consisting essentially of activated alumina precalcined at a temperature of about 800°–1300° F. and having incorporated therein subsequent to being precalcined from 0.5 to 25% of silica.

3. A process for the preparation of low-molecular-weight alkyl monosulfides which comprises reacting a $C_1$–$C_8$ monohydric alkanol with hydrogen sulfide, in a mole ratio of $H_2S$/alcohol of about 0.2–0.7, at a temperature of about 600–950° F. and a pressure of about atmospheric to 200 p.s.i.g., in the presence of an alumina-silica catalyst consisting essentially of activated alumina precalcined at a temperature of about 800° F.–1300° F. and having incorporated therein subsequent to being precalcined from 0.5 to 25% of silica.

4. A method in accordance with claim 2 in which said activated alumina is precalcined at a temperature of about 1000°–1200° F.

5. A method in accordance with claim 3 in which said activated alumina has a surface area of not less than 10 sq. meters/gram.

6. A method in accordance with claim 3 in which said silica is present in an amount between about 2–10% by weight.

References Cited in the file of this patent

UNITED STATES PATENTS

| | | |
|---|---|---|
| 2,786,079 | Folkins | Mar. 19, 1957 |
| 2,816,146 | Doumani | Dec. 10, 1957 |

FOREIGN PATENTS

| | | |
|---|---|---|
| 1,119,053 | France | June 14, 1956 |